(12) United States Patent
Winter

(10) Patent No.: US 9,611,027 B2
(45) Date of Patent: Apr. 4, 2017

(54) RAMPED STIFFENER AND APPARATUS AND METHOD FOR FORMING THE SAME

(75) Inventor: Darren John Winter, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/003,883

(22) PCT Filed: Jul. 14, 2009

(86) PCT No.: PCT/GB2009/050844
§ 371 (c)(1),
(2), (4) Date: Jan. 13, 2011

(87) PCT Pub. No.: WO2010/007415
PCT Pub. Date: Jan. 21, 2010

(65) Prior Publication Data
US 2011/0115115 A1    May 19, 2011

(30) Foreign Application Priority Data
Jul. 18, 2008    (GB) .................................. 0813149.2

(51) Int. Cl.
| B29C 43/24 | (2006.01) |
| B64C 1/06 | (2006.01) |
| B29C 70/50 | (2006.01) |
| B29D 99/00 | (2010.01) |
| B64C 3/18 | (2006.01) |
| B64C 1/00 | (2006.01) |

(52) U.S. Cl.
CPC ............ B64C 1/064 (2013.01); B29C 70/504 (2013.01); B29D 99/0007 (2013.01);
(Continued)

(58) Field of Classification Search
CPC . B64C 1/064; B64C 3/182; B64C 2001/0072; B29C 70/504; B29C 53/22; B29D 99/0007; Y02T 50/433
See application file for complete search history.

(56) References Cited

U.S. PATENT DOCUMENTS 3,034,608 A * 5/1962 Dengler .................. B64C 3/182
29/897.3
3,355,922 A    12/1967 Utashiro et al.
(Continued)

FOREIGN PATENT DOCUMENTS

| EP | 1134070 | 9/2001 |
| EP | 1408224 | 4/2004 |

(Continued)

OTHER PUBLICATIONS

English Translation of JP 06-226356.*
(Continued)

*Primary Examiner* — Yogendra Gupta
*Assistant Examiner* — Ninh Le
(74) *Attorney, Agent, or Firm* — Hauptman Ham, LLP

(57) ABSTRACT

A stiffener has an elongate web element and an elongate foot element connected by a curved elbow that has a radius greater over a first portion than over a second portion of the stiffener. The stiffener is formed by feeding an elongate member through a roll forming die having first and second rollers, the first roller having a shaped section arranged to be located within a correspondingly shaped recess in the second roller, the first and second rollers defining a gap therebetween corresponding to the desired shape to be imparted on the elongate member, the desired shape including a curved elbow between a web and a foot portion, wherein the shapes of the recess and the shaped section vary such that the radius of curvature of the gap between the rollers corresponding to the curved elbow varies between a minimum and a maximum value.

4 Claims, 7 Drawing Sheets

(52) U.S. Cl.
CPC ...... *B64C 3/182* (2013.01); *B64C 2001/0072* (2013.01); *Y02T 50/433* (2013.01)

(56) References Cited

U.S. PATENT DOCUMENTS

| | | | |
|---|---|---|---|
| 3,945,783 A * | 3/1976 | Paton | 425/122 |
| 5,026,447 A * | 6/1991 | O'Connor | 156/166 |
| 5,182,060 A * | 1/1993 | Berecz | 264/70 |
| 5,820,804 A * | 10/1998 | Elmaleh | 264/167 |
| 6,701,990 B1 * | 3/2004 | Burley et al. | 156/463 |
| 7,682,682 B2 | 3/2010 | Leon-Dufour et al. | |
| 2005/0056362 A1 * | 3/2005 | Benson | B29C 70/388 |
| | | | 156/163 |
| 2007/0175573 A1 | 8/2007 | Fox et al. | |

FOREIGN PATENT DOCUMENTS

| | | |
|---|---|---|
| EP | 1566334 | 8/2005 |
| JP | 59027722 | 2/1984 |
| JP | 59179228 | 10/1984 |
| JP | 6226356 | 8/1994 |
| JP | 7089353 | 4/1995 |
| RU | 2144487 C1 | 1/2000 |
| RU | 2219058 C1 | 12/2003 |
| SU | 1304743 A3 | 4/1987 |
| WO | 0024563 | 5/2000 |
| WO | 0037244 | 6/2000 |
| WO | 2005105413 | 11/2005 |
| WO | 2005105413 A2 | 11/2005 |
| WO | 2009004362 | 1/2009 |
| WO | 2009004364 | 1/2009 |

OTHER PUBLICATIONS

UK Search Report for GB0813149.2 mailed Nov. 13, 2008.
UK Search Report for GB0813149.2 mailed Dec. 3, 2008.
International Search Report for PCT/GB2009/050844 mailed Mar. 22, 2010.
Russian OA—Decision on Granting with English translation dated Jun. 18, 2013.

* cited by examiner

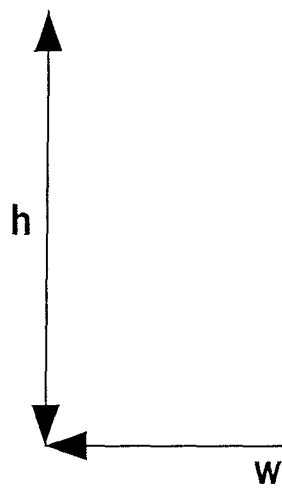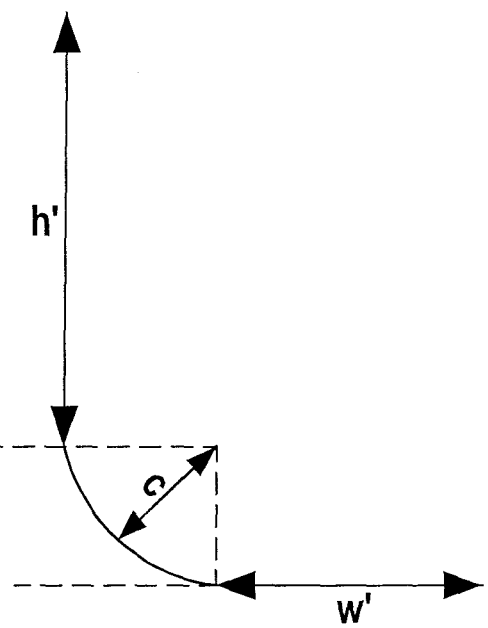
FIGURE 6A
FIGURE 6B

RAMPED STIFFENER AND APPARATUS AND METHOD FOR FORMING THE SAME

BACKGROUND TO THE INVENTION

In the fabrication of composite structures, for example within the aerospace industry, structural members are often attached to a composite skin to provide reinforcement of the skin. Such structural members may include substantially elongated stiffening members often referred to as stringers or stiffeners. A typical example of the use of stiffeners within the aerospace industry is in the formation of an aircraft wing in which a composite stringer is attached to the inner surface of a wing cover, or skin. The stringers or stiffeners may be formed to exhibit various cross-sectional geometries but are typically formed to be T-section. Typically T-section stiffeners are produced from flat, uncured, pre-impregnated composite laminates that are formed into L-sections that are then compressed back-to-back producing the desired T-section. This produces a T-section stiffener that is easily attached to a flat composite skin. However, it is increasingly common practice to vary the thickness of the composite skin to locally vary the strength of the skin as desired. The variations in thickness produce ramped, or non-planar, sections across the composite skin to which the stringers are to be attached. To make the elongate stiffeners conform to the ramped skin surface the stiffeners must be deformed to the required profile after being formed into either the separate L-sections or the finished T-section. Since this involves deforming the stiffeners across a three dimensional section, rather than the two dimensional section of the original planar laminate, wrinkling often occurs in the T-section stiffener where a portion of the composite laminate is compressed. Such wrinkles provide localised stress points, thus reducing the overall strength of the stiffener and therefore requiring the stiffener to be made larger than would otherwise be necessary, and can also prevent L-sections from being compressed back-to-back to form the required T-section stiffener.

It would therefore be beneficial to be able to form such stiffeners without experiencing the problem of wrinkling.

EP 1 134 070 A refers to a process for manufacturing pre-cured parts of composite material with green-applied stiffeners, in which at least two parts manufactured in composite materials are structurally bonded. A base part or support is cured and a stiffener is in a green condition. The bonding of both parts is carried out by means of a structural adhesive sheet in such a way that the stiffener is compacted against the base part with adequate cross linking of the resin of its composite material, so strongly adhered to the skin of the base part.

WO 2005/105413 discloses an improved automated method and apparatus for forming composite structures by calendering two or more elements of a pre-impregnated composite material into a band of uncured composite material and then forming the uncured band of composite material into one or more formed, uncured, composite structures.

SUMMARY OF THE INVENTION

According to a first aspect of the present invention there is provided a stiffener having an elongate web element and at least one elongate foot element, the web element and foot element being connected by a curved elbow, wherein the radius of the curved elbow is greater over a first portion of the stiffener than over a second portion of the stiffener.

Additionally, the foot element over the first portion of the stiffener may be vertically displaced relative to the foot element over the second portion of the stiffener.

Additionally or alternatively, the radius of the curved elbow over an intermediate portion of the stiffener between the first and second portions varies between a respective maximum and minimum value.

Additionally or alternatively, the height of the web element is substantially constant over the length of the stiffener.

Preferably, the web and foot elements are at substantially 90° with respect to each other. Additionally, the stiffener may have two elongate foot elements such that the stiffener is substantially T-shaped in cross-section.

According to a second aspect of the present invention there is provided a roll forming die comprising first and second rollers, the first roller having a shaped section arranged to be located within a correspondingly shaped recess in the circumferential surface of the second roller, the first and second rollers defining a gap there between corresponding to the desired shape to be imparted on an elongate member passed between the rollers, the desired shape including a curved elbow between a web and a foot portion, wherein the shape of the recess in the second roller and the shape of the corresponding section of the first roller vary around a portion of the rollers circumference such that the radius of curvature of the gap between the rollers corresponding to the curved elbow varies between a minimum and a maximum value.

Additionally, the shaped section of the first roller and the correspondingly shaped recess in the second roller may be formed such that the portions of the gap formed there between corresponding to the desired web and foot portions are at substantially 90° to one another. Additionally, the first and second rollers are formed such that the gap formed there between is substantially U-shaped.

Additionally or alternatively, the first and second rollers may be rotatable. Preferably the rollers are shaped such that the radius of curvature of the gap formed there between corresponding to the curved elbow varies between the minimum and maximum value are a half rotation of the rollers.

According to a third aspect of the present invention there is provided a method of forming a stiffener according the first aspect of the present invention, the method comprising feeding an elongate member through a roll forming die according to the second aspect of the present invention and rotating the die rollers between a first and a second position as a portion of the elongate member is fed between the die rollers, whereby the radius of the curved elbow formed in the stiffener is varied.

Preferably, the elongate member may be subsequently fed through a further set of die rollers arranged such that the elongate member is folded over along its longitudinal axis. Preferably, the stiffener may comprise a non-metallic composite material.

BRIEF DESCRIPTION OF THE DRAWINGS

Embodiments of the present invention are described, by way of non-limiting illustrative example only, below with reference to the accompanying drawings, of which:

FIGS. 6A and 6B schematically illustrate an L-section element with different radii of curvature according to an embodiment of the present invention;

DESCRIPTION OF PREFERRED EMBODIMENTS OF THE INVENTION

Figure 1:
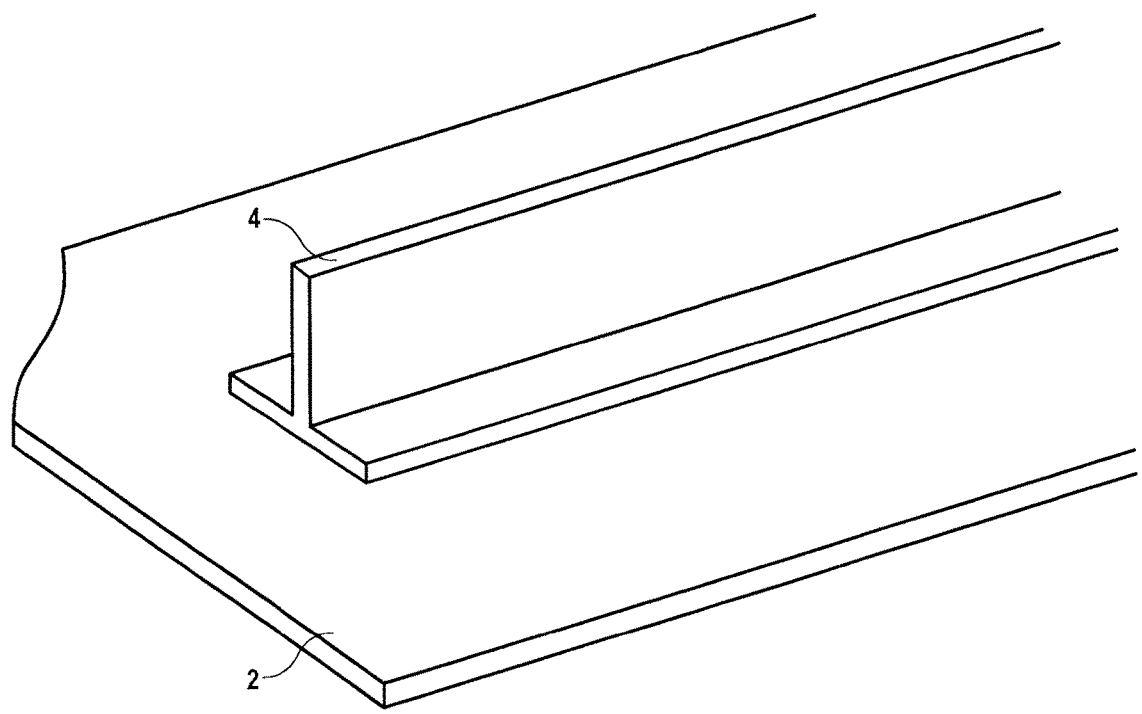
FIG. 1 illustrates a section of planar composite skin with an attached T-section stiffener.

FIG. 1 schematically illustrates a section of composite skin 2, such as an aircraft wing cover, to which a T-section stiffener 4 has been attached as is known from the prior art. The surface of the aircraft cover 2 to which the stiffener 4 has been attached is flat, meaning that the stiffener 4 need only be correspondingly flat across its attachment surface.

Figure 2:
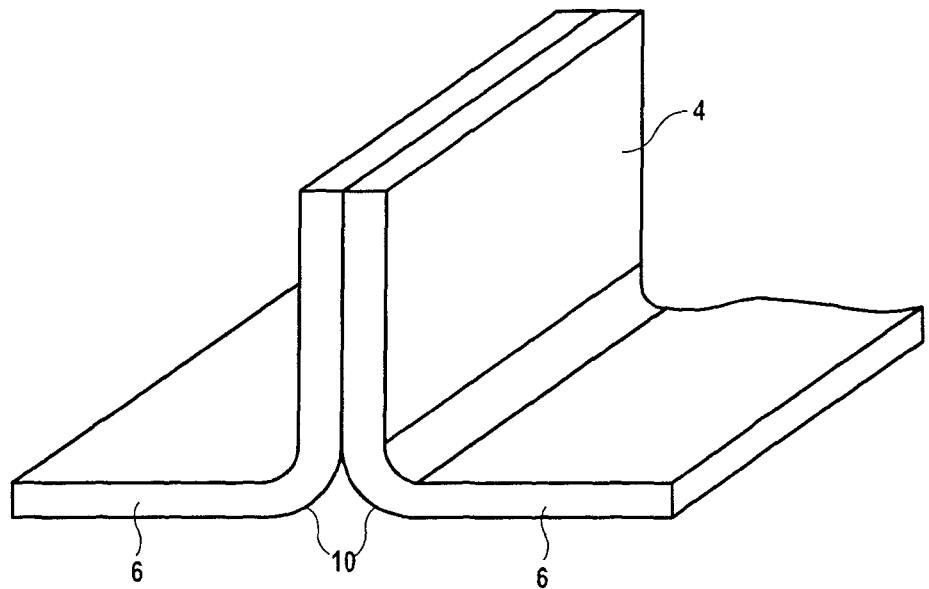
FIG. 2 illustrates a section of a T-section stiffener formed by two back-to-back L-section elements.

FIG. 2 illustrates an end portion of the stiffener 4 in better detail to illustrate a typical method of manufacture of such T-section stiffeners. The completed stiffener 4 actually comprises two separate L-section elongate elements 6 bonded together back-to-back. The L-section elements 6 are formed from elongate planar sections of composite laminate 8 (see FIG. 3) that is passed through a series of rollers and dies 9 that are arranged to bend one section of the elongate laminate in increments to approximately 90° to the remainder of the laminate, thus forming the L-section element 6 shown in FIG. 2. The planar composite laminate may be heated immediately prior to or as it is passed through the rollers and dies 8 to facilitate the bending of the laminate. As a consequence of this bending action the L-section elements 6 illustrated in FIG. 2 have a radiused elbow 10.

Figure 4:
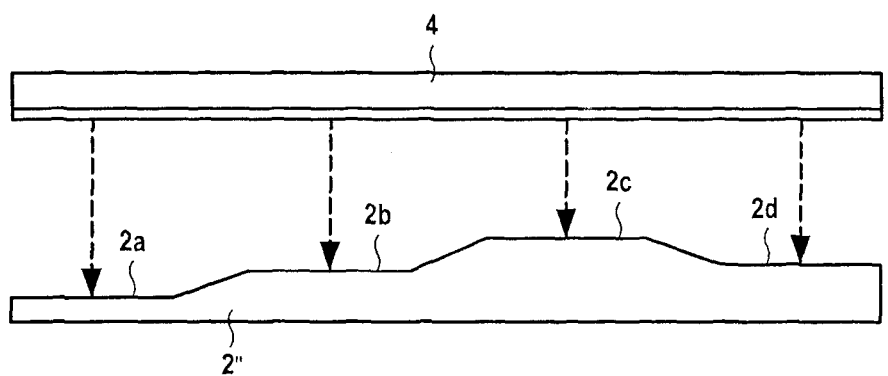
FIG. 4 schematically illustrates the placement of a T-section stiffener according to the prior art over a non-planar section of the composite skin.
Figure 5:
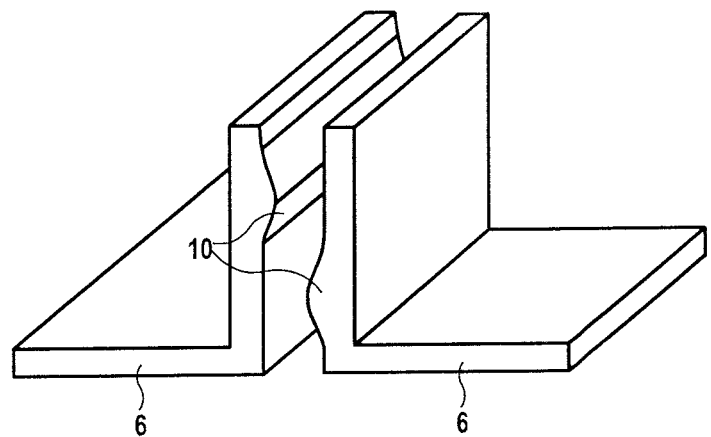
FIG. 5 schematically illustrates the formation of wrinkles onto adjacent L-section stiffener elements according to the prior art.

FIG. 4 schematically illustrates in cross-section a more typical arrangement of composite skin 2' and stiffener 4. In this more typical arrangement, the composite skin 2' is not planar but has sections of differing thickness 2A-2D, the section of differing thickness being provided in those areas that require greater or lower strength of the composite skin. As illustrated in FIG. 4, it will thus be appreciated that the prior art, planar, stiffener 4 cannot conform to the ramped profile of the skin cover 2' without undergoing some deformation. Whilst it is possible to deform the T-section stiffener to conform to the ramped profile of the composite cover 2', since the deformation involves either compressing or stretching those sections of the vertical portion of the T-section at the intersections between different thicknesses of the composite skin, wrinkling of the individual L-section elements 6 tends to occur. This is illustrated in FIG. 5 where each of the L-section elements 6 have an elongate wrinkle 12 formed on the surfaces to be abutted together to form the final T-section stiffener. The presence of these wrinkles 12 prevents the surfaces of the separate L-section elements from being abutted completely to one another, thus reducing the strength of the bond between the two L-section elements, and also introduce inherent weaknesses in the stiffener 4 due to such known processes as stress concentration.

According to the present invention such deformation of the L-section elements or final T-section stiffener is avoided by varying the radius of curvature of the L-section elements, which in turn has the effect of varying the height of the stiffener feet (the part of the stiffener attached to the composite skin) relative to the height of the central web of the stiffener. This is schematically illustrated in FIG. 6A and FIG. 6B. FIG. 6A schematically illustrates the cross section of an L-section element having a web height h, a foot width w and with radius of curvature between the stiffener web and foot of r=0. (It is appreciated that a zero radius would be difficult to achieve in practice and undesirable but is used for illustrative purposes in this instance.) FIG. 6B shares a corresponding L-section element having a web height h'=h but with a radius of curvature between the web and foot of r=3h/8. It can readily be seen that the level of the stiffener foot in FIG. 6B is lower with respect to the top of the web by a distance equal to r. It will also be observed that the width w' of the stiffener foot illustrated in FIG. 6B is considerably shorter than the width w of the stiffener foot illustrated in FIG. 6A.

Figure 7:
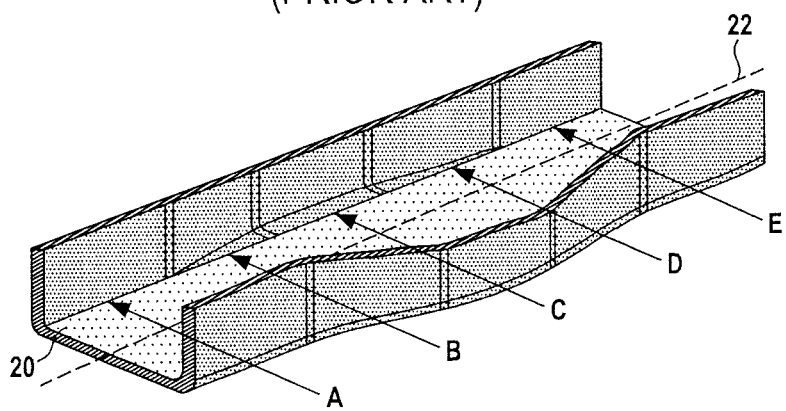
FIG. 7 schematically illustrates a C-section element formed in accordance with the present invention.
Figure 8:
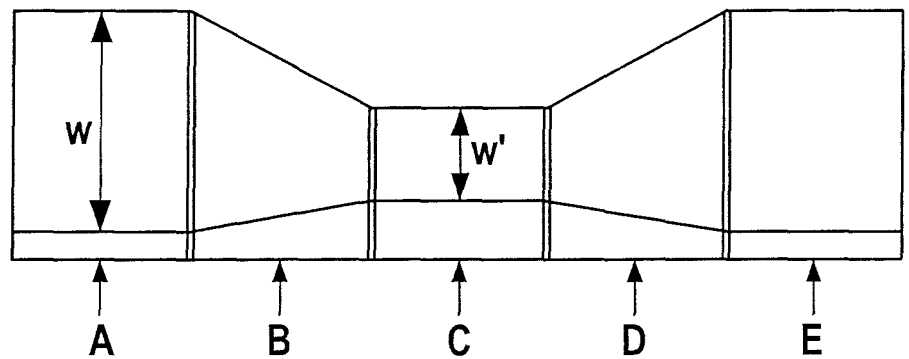
FIG. 8 schematically illustrates the side elevation of the C-section element shown in FIG. 7.

Consequently, in embodiments of the present invention the L-section elements 6 are formed with the radius of curvature between the stiffener web and foot varying between minimum and maximum values along the length of the elongate element, the radius being greater where it is desired to increase the height of the stiffener web, i.e. to effectively lower the stiffener foot with respect to the top of the stiffener web. FIG. 7 schematically illustrates a C-section elongate element 20 that has been formed according to principles of the present invention with varying radiuses of curvature. The C-section element 20 is effectively two identical L-section elements formed from a single original planar web of composite material and is subsequently formed into the desired T-section stiffener by further folding the C-section element 20 along its central axis, indicated by the broken line 22 in FIG. 7. The C-section element shown in FIG. 7 includes two sections, labelled A and E having a minimum radius of curvature, a central section labelled C having constant maximum radius of curvature and two transitional sections B, D in which the radius of curvature continuously varies between the minimum and maximum values. A side elevation of the C-section element shown in FIG. 7 is illustrated in FIG. 8 with the corresponding sections identically labelled. It can be seen from FIG. 8 that the height of the planar section in section C, which corresponds to the width of the finally formed stiffener foot w' shown in FIG. 6B is less than that in sections A and E.

Figure 9:
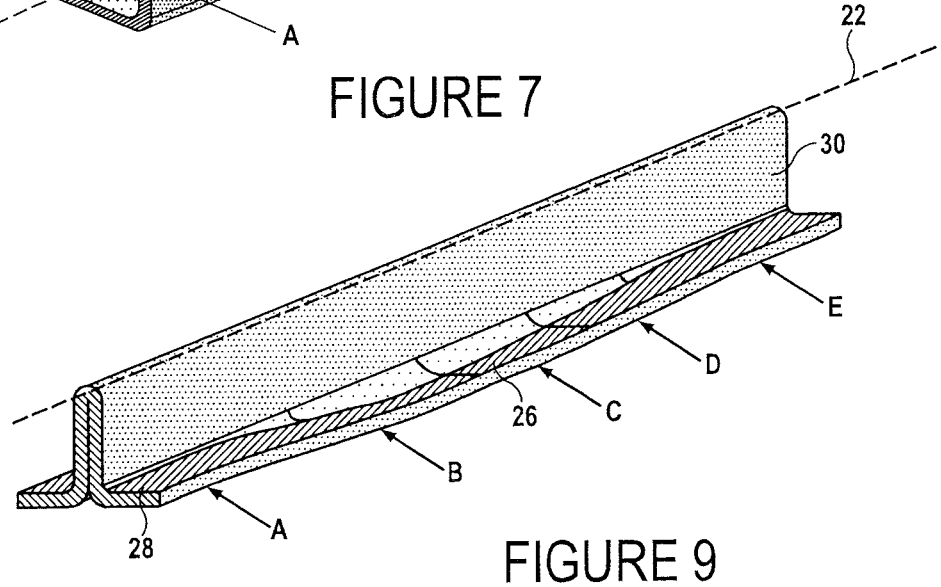
FIG. 9 schematically illustrates a T-section stiffener formed from the C-section element of FIG. 7.
Figure 10:
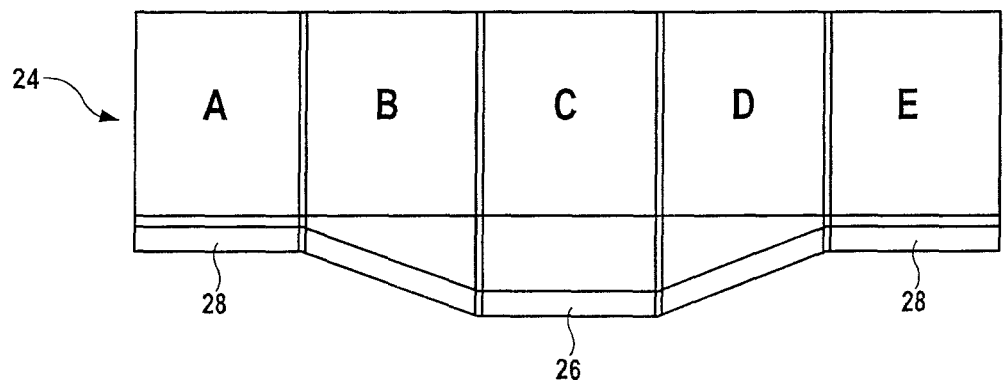
FIG. 10 schematically illustrates the side elevation of the stiffener shown in FIG. 9.
Figure 11:
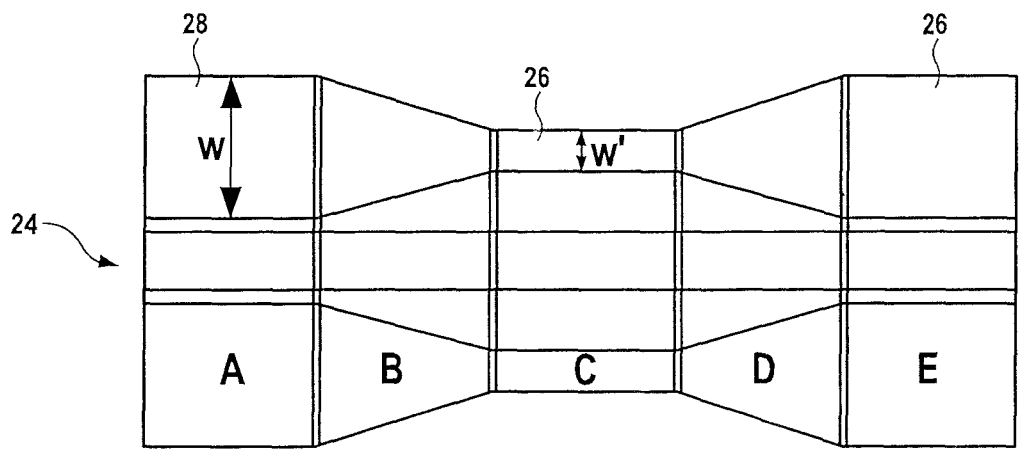
FIG. 11 schematically illustrates the plan view of the stiffener shown in FIG. 9.

The finally formed T-section stiffener, formed by further folding the C-section element of FIG. 7 along the broken line 22 as previously indicated, is illustrated in FIG. 9. The middle section C of the stiffener 24, which has the greatest radius of curvature in the transitional zone between the stiffener foot and web 30, has a foot section 26 that is vertically displaced relative to the top of the stiffener web, with respect to the stiffener foot portions 28 of the end sections A and E, which have the minimum radius of curvature of transitional zone. This is more clearly illustrated in FIG. 10, which is a schematic side elevation of the fully formed stiffener 24 shown in FIG. 9. As mentioned above, the width w' of the stiffener foot 26 in those sections having the maximum radius of curvature of the transitional section is less than the width of the stiffener foot in other sections. This is clearly visible from the plan view of the fully formed T-section stiffener 24 illustrated in FIG. 11.

Figure 3:
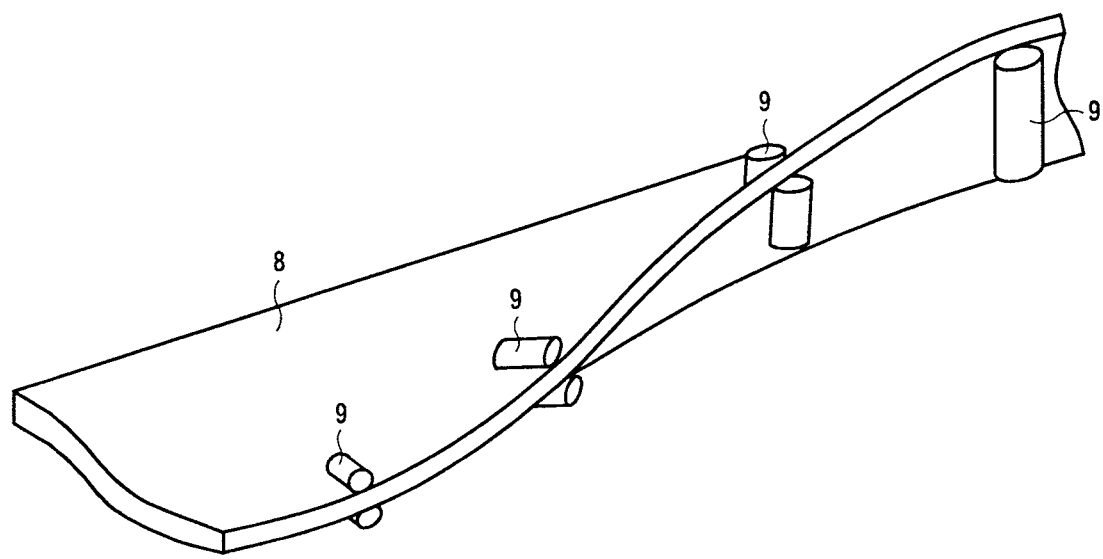
FIG. 3 schematically illustrates the formation of an L-section element from a planar laminate.

To produce the ramped stiffener 24 illustrated in FIG. 9, and in particular to produce the shaped C-section element 20 illustrated in FIG. 7, a C-section element of uniform cross-section is first produced from an elongate planar section of composition material using known roll forming techniques as previously discussed in relation to FIG. 3. However, the uniform cross-section C-section is then passed through a further set of dies that are formed according to a further aspect of the present invention so as to enable the radius of curvature r of the C-section element 20 to vary as desired to form the ramped T-section stiffener 24 according to a first aspect of the present invention as illustrated in FIG. 9. A set of dies according to an embodiment of the second aspect of the present invention used to vary the radius of curvature r is illustrated in FIGS. 12 and 13.

Figure 12:
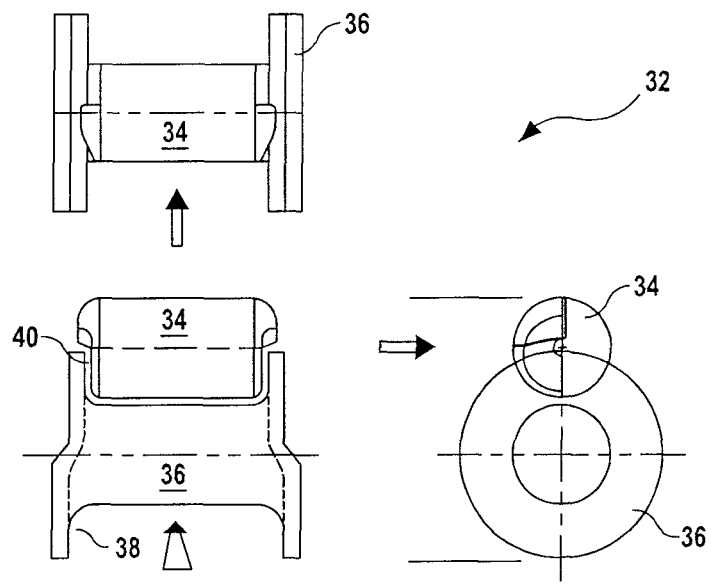
FIG. 12 schematically illustrates the front, side and plan view of a roller die according to an embodiment of the present invention in a first orientation.
Figure 13:
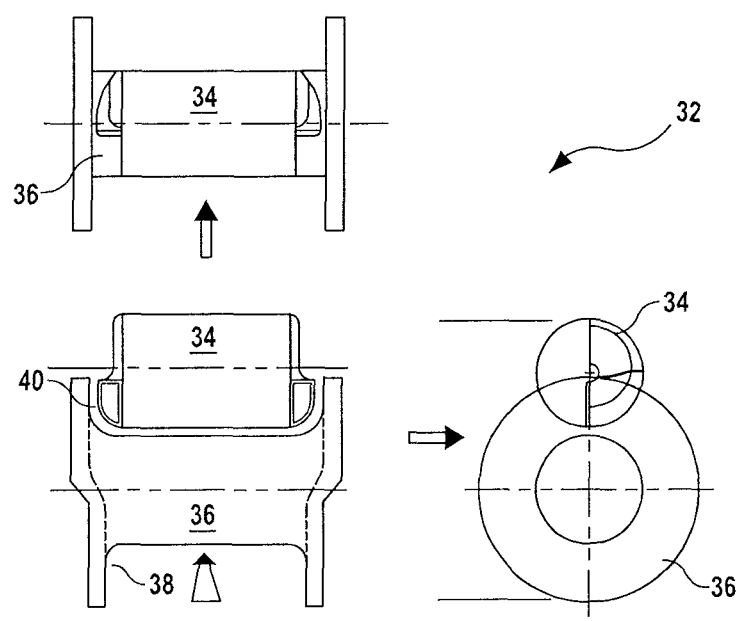
FIG. 13 schematically illustrates corresponding views of the roller die of FIG. 12 in a second orientation.

Referring to FIG. 12, the die 32, which is illustrated in a composite view of front, side and plan elevations, includes first and second complementary rollers 34, 36. The second roller 36, which in the orientation of the die 32 illustrated in FIG. 12 is the bottom roller, has a U-shaped channel 38 formed in the outer circumferential surface of the roller. The depth, width and radius of curvature between the horizontal and vertical sections of the U-shaped channel 38 varies round a 180° segment of the second roller 36 between a first set of values corresponding to the desired outer dimensions of the C-shaped section 20 with the radius of curvature r at the desired minimum value and a second set of values corresponding to the desired outer dimensions of the C-section 20 when the radius of curvature r is at the desired maximum. The transition over the 180° of the second roller 36 between the first and second set of values for width, depth and radius of curvature is continuous, i.e. there are no step changes in the dimensions of the U-shaped channel 38, and preferably has a constant rate of change over the entire 180° The first roller 34, which in the orientation illustrated in FIG. 12 represents the upper roller, as an outer surface that is arranged in use to extend into the U-shaped channel 38 of the second roller 36 and is dimensioned such that a U-shaped, or a C-section, gap 40 corresponding to the desired thickness of the C-section element 20 to be formed is present between the first and second rollers 34, 36. To maintain the gap 40 at a constant value over the full variation in dimensions of the U-shaped channel 38 in the second roller 36, the dimensions of the outer surface of the first roller 34 correspondingly vary over 180° between a first set of dimensions in which the radius of curvature between the horizontal and vertical outer surfaces of the roller 34 is at a minimum to a second set of dimensions in which the radius of curvature is at a maximum, the transition again being continuous and at a corresponding rate to the transition in dimensions of the second roller 36.

The elevations of the first and second rollers of the die shown in FIG. 12 illustrate the rollers in a first position in which the gap 40 between the rollers corresponds to the desired shape of the C-section 20 when the radius of curvature between the subsequently formed web 30 and foot portions is at a minimum. In use, an elongate section of composite material, preferably already preformed by previous rollers and dies to a shape approximating to the desired C-section, is fed between the first and second rollers 34, 36 of the die 32 through the gap 40 between the rollers. The direction of feed of the elongate element is indicated by the shaded arrows shown on each of the elevations in FIG. 12.

It should be appreciated that at this point the rollers 34, 36 are in fact stationary so as to maintain the dimensions of the gap 40 between the two rollers constant. When it is desired to increase the radius of curvature between the foot portions and central web of the C-section element, so as to lower the resulting foot portions with respect to the top of the web, the upper and lower rollers 34, 36 of the die are rotated together by an equal amount and at an equal rate. In the particular embodiment illustrated in FIG. 12, the direction of rotation would be counter-clockwise for the first, upper, roller 34 and clockwise for the second, lower roller 36. However, the first and second rollers could easily be arranged such that the direction of rotation is in the opposite sense. The act of rotating the rollers of the die 32, in conjunction with the variation in the dimensions of the outer surface of the first roller 34 and the U-shaped channel 38 of the second roller 36, results in the gap 40 between the rollers through which the elongate composite element passes smoothly varies.

FIG. 13 shows corresponding front, side and plan elevations of the die 32 illustrated in FIG. 12 but with the first and second rollers 34, 36 having been rotated a full 180° with respect to the orientation shown in FIG. 12. Consequently, the gap 40 between the first and second rollers 34, 36 has a shape and dimensions corresponding to the desired shape of the C-section element with the radius of curvature r between the central web section and foot portions being at the maximum desired value. As will be appreciated, once the first and second rollers have been rotated to the point at which the gap 40 has the desired shape and dimensions, rotation of the rollers is stopped such that as the elongate composite section continuous to pass between the narrow stationary rollers it has a constant cross-section corresponding to the shape of the gap 40. To transition back to a cross-section of the C-section element in which the radius of curvature r is reduced, the first and second rollers of the die 32 are rotated together in the opposite direction by the required amount. The mounting of the rollers 34, 36 of the die 32 and the means of causing and controlling their respective rotation does fall within the scope of the present invention, since it is considered that a person skilled within the art would be able to provide the appropriate mechanisms from their existing knowledge. For example, the rollers may be rotated by a separate electrical or hydraulic, for example, actuators under the control of an appropriate electronic system, or may be mechanically linked to one another, for example by one or more gears or toothed belts, such that the rollers may be rotated together using a single actuator.

The aspects of the present invention described herein provide an improved ramped stiffener or stringer, suitable for attaching to the correspondingly ramped, i.e. non-planar, skin or cover, together with method and apparatus for producing the stiffener.

The invention claimed is:

1. A method of forming a T-shaped stiffener having an elongate web element and at least one elongate foot element, the web element and foot element being connected by a curved elbow, the method comprising feeding a solid elongate member through a roll forming die comprising first and second rollers, the first roller having a shaped section arranged to be located within a correspondingly shaped recess in a circumferential surface of the second roller, the first and second rollers defining a gap between them corresponding to a desired shape to be imparted on an elongate member passed between the rollers, the desired shape including a curved elbow between a web and a foot portion, wherein:

the shape of the recess in the second roller and the shape of the corresponding section of the first roller vary around a portion of the rollers circumference such that a radius of curvature of the gap between the rollers corresponding to the curved elbow varies between a minimum and a maximum value; and the method further comprises:

holding the first and second rollers stationary while feeding the solid elongate member between the first and second rollers as a first portion of the solid elongate member is fed between the first and second rollers, whereby a radius of the curved elbow formed in the stiffener is constant along that first portion, and then rotating the first and second rollers between a first and a second position while feeding the solid elongate member between the first and second rollers as a further portion of the solid elongate member is fed between the first and second rollers, whereby a radius of the curved elbow formed in the stiffener is varied along that further portion, wherein the stiffener formed is C-shaped which is transformed into T-shape by folding along a central axis of the C-shaped stiffener.

2. The method of claim 1, wherein the stiffener comprises a non-metallic composite material.

3. The method of claim 1, wherein the first and second rollers are shaped such that the radius of curvature of the gap formed therebetween corresponding to the curved elbow varies between the minimum and maximum value over a half rotation of the rollers.

4. A method of forming a T-shaped stiffener having an elongate web element and at least one elongate foot element, the web element and foot element being connected by a curved elbow, the method comprising feeding an elongate member through a roll forming die comprising first and second rollers, the first roller having a shaped section arranged to be located within a correspondingly shaped recess in a circumferential surface of the second roller, the first and second rollers defining a gap between them corresponding to a desired shape to be imparted on an elongate member passed between the rollers, the desired shape including a curved elbow between a web and a foot portion, wherein:

the shape of the recess in the second roller and the shape of the corresponding section of the first roller vary around a portion of the rollers circumference such that a radius of curvature of the gap between the rollers corresponding to the curved elbow varies between a minimum and a maximum value; and the method further comprises:

holding the first and second rollers stationary while feeding the elongate member between the first and second rollers as a first portion of the elongate member is fed between the first and second rollers, whereby the radius of the curved elbow formed in the stiffener is constant along that first portion, and then rotating the first and second rollers between a second position and a third position as a second portion of the elongate member is fed between the first and second rollers, whereby a radius of the curved elbow formed in the stiffener is varied along that second portion, and then holding the first and second rollers stationary as a further portion of the elongate member is fed between the first and second rollers, whereby a radius of the curved elbow formed in the stiffener is constant along that further portion, wherein the stiffener formed is C-shaped which is transformed into T-shape by folding along a central axis of the C-shaped stiffener.

* * * * *